United States Patent
Kurzweil

(10) Patent No.: US 10,645,338 B2
(45) Date of Patent: May 5, 2020

(54) VIRTUAL ENCOUNTERS

(71) Applicant: Raymond C. Kurzweil, Newton, MA (US)

(72) Inventor: Raymond C. Kurzweil, Newton, MA (US)

(73) Assignee: Beyond Imagination Inc., Burbank, CA (US)

( * ) Notice: Subject to any disclaimer, the term of this patent is extended or adjusted under 35 U.S.C. 154(b) by 46 days.

(21) Appl. No.: 15/949,120

(22) Filed: Apr. 10, 2018

(65) Prior Publication Data

US 2018/0316889 A1 Nov. 1, 2018

Related U.S. Application Data

(63) Continuation of application No. 10/735,595, filed on Dec. 12, 2003, now Pat. No. 9,948,885.

(51) Int. Cl.

| | |
|---|---|
| *H04N 7/14* | (2006.01) |
| *G06F 3/01* | (2006.01) |
| *A63F 13/31* | (2014.01) |
| *A63F 13/30* | (2014.01) |
| *H04N 13/385* | (2018.01) |

(52) U.S. Cl.
CPC ............ *H04N 7/141* (2013.01); *A63F 13/30* (2014.09); *A63F 13/31* (2014.09); *G06F 3/011* (2013.01); *G06F 3/016* (2013.01); *H04N 7/14* (2013.01); *H04N 13/385* (2018.05); *A63F 2300/1093* (2013.01); *A63F 2300/5553* (2013.01); *A63F 2300/69* (2013.01)

(58) Field of Classification Search
CPC ...... H04N 5/247; H04N 7/141; H04N 13/385; H04N 7/14; H04N 7/181; G06F 3/01; G06F 3/011; G06F 3/016; G06F 3/04815; G06K 9/00664; G06K 9/00671; G06T 2207/10016; G06T 7/20; A63F 13/12; A63F 13/30; A63F 13/31; A63F 2300/5553; A63F 2300/69
See application file for complete search history.

(56) References Cited

U.S. PATENT DOCUMENTS

| | | |
|---|---|---|
| 613,809 A | 11/1898 | Tesla |
| 5,103,404 A | 4/1992 | McIntosh |
| 5,111,290 A | 5/1992 | Gutierrez |
| 5,659,691 A | 8/1997 | Durward et al. |

(Continued)

FOREIGN PATENT DOCUMENTS

WO    WO 00/59581    10/2000

OTHER PUBLICATIONS

Hasunuma et al., "Development of Teleportation Master System with a Kinesthetic Sensation of Presence", Retrieved from the Internet, p. 1-7, 1999.

(Continued)

*Primary Examiner* — Jingge Wu
(74) *Attorney, Agent, or Firm* — Fish & Richardson P.C.

(57) ABSTRACT

A virtual encounter system includes a mannequin coupled to a camera for receiving a video image. The camera sends the video image to a communications network. The virtual encounter system also includes a processor for overlaying a virtual environment over one or more portions of the video image to form a virtual scene and a set of goggles to render the virtual scene.

21 Claims, 10 Drawing Sheets

(56) References Cited

U.S. PATENT DOCUMENTS

| | | | |
|---|---|---|---|
| 5,845,540 A | 12/1998 | Rosheim | |
| 5,889,672 A | 3/1999 | Schuler | |
| 5,980,256 A | 11/1999 | Carmein | |
| 5,984,880 A | 11/1999 | Lander et al. | |
| 6,005,548 A | 12/1999 | Latypov et al. | |
| 6,016,385 A | 1/2000 | Yee et al. | |
| 6,275,213 B1 | 8/2001 | Tremblay | |
| 6,368,268 B1 | 4/2002 | Sandvick | |
| 6,583,808 B2 | 6/2003 | Boulanger et al. | |
| 6,695,770 B1 | 2/2004 | Choy et al. | |
| 6,726,638 B2 | 4/2004 | Ombrellaro | |
| 6,741,911 B2 | 5/2004 | Simmons | |
| 6,771,303 B2 | 8/2004 | Zhang et al. | |
| 6,786,863 B2 | 9/2004 | Abbasi | |
| 6,832,132 B2 | 12/2004 | Ishida et al. | |
| 6,958,746 B1 | 10/2005 | Anderson et al. | |
| 7,046,151 B2 | 5/2006 | Dundon | |
| 7,095,422 B2 | 8/2006 | Shouji | |
| 7,124,186 B2 | 10/2006 | Piccionelli | |
| 7,164,969 B2 | 1/2007 | Wang et al. | |
| 7,164,970 B2 | 1/2007 | Wang et al. | |
| 7,333,622 B2 | 2/2008 | Algazi et al. | |
| 8,600,550 B2 | 12/2013 | Kurzweil | |
| 9,259,282 B2 * | 2/2016 | Azizian | B25J 9/1697 |
| 9,479,732 B1 * | 10/2016 | Saleh | H04N 5/3572 |
| 9,841,809 B2 * | 12/2017 | Kurzweil | G06F 3/04815 |
| 9,948,885 B2 | 4/2018 | Kurzweil | |
| 9,971,398 B2 * | 5/2018 | Kurzweil | G06F 3/01 |
| 2002/0049566 A1 | 4/2002 | Friedrich et al. | |
| 2002/0080094 A1 | 6/2002 | Biocca | |
| 2002/0116352 A1 | 8/2002 | Kilgard et al. | |
| 2002/0127526 A1 | 9/2002 | Hruska | |
| 2002/0188186 A1 * | 12/2002 | Abbasi | A61B 5/486 600/380 |
| 2003/0030397 A1 | 2/2003 | Simmons | |
| 2003/0036678 A1 * | 2/2003 | Abbassi | A61H 19/50 600/38 |
| 2003/0093248 A1 | 5/2003 | Vock et al. | |
| 2003/0229419 A1 | 12/2003 | Ishida et al. | |
| 2004/0046777 A1 | 3/2004 | Tremblay et al. | |
| 2004/0088077 A1 | 5/2004 | Jouppi et al. | |
| 2004/0104935 A1 | 6/2004 | Williamson et al. | |
| 2005/0014560 A1 * | 1/2005 | Blumenthal | G06F 3/016 463/36 |
| 2005/0027794 A1 | 2/2005 | Decker | |
| 2005/0062869 A1 * | 3/2005 | Zimmermann | G02B 13/06 348/335 |
| 2005/0130108 A1 * | 6/2005 | Kurzweil | H04N 7/147 434/307 R |
| 2005/0131580 A1 * | 6/2005 | Kurzweil | B25J 13/00 700/245 |
| 2005/0131846 A1 | 6/2005 | Kurzweil | |
| 2005/0140776 A1 | 6/2005 | Kurzweil | |
| 2005/0143172 A1 | 6/2005 | Kurzweil | |
| 2009/0312871 A1 * | 12/2009 | Lee | G01C 21/00 700/259 |
| 2012/0038739 A1 * | 2/2012 | Welch | H04N 13/388 348/14.01 |
| 2012/0045742 A1 * | 2/2012 | Meglan | G09B 23/28 434/268 |
| 2012/0167014 A1 * | 6/2012 | Joo | G06F 3/01 715/849 |
| 2013/0250034 A1 * | 9/2013 | Kang | G06F 3/011 348/14.02 |
| 2014/0057236 A1 * | 2/2014 | Meglan | G09B 23/28 434/268 |
| 2015/0258432 A1 * | 9/2015 | Stafford | A63F 13/213 463/32 |
| 2016/0041581 A1 * | 2/2016 | Piccionelli | G06F 1/163 345/156 |
| 2017/0206710 A1 * | 7/2017 | Touma | G09G 3/2092 |
| 2017/0296897 A1 * | 10/2017 | Simpson | A63B 69/004 |
| 2017/0334066 A1 * | 11/2017 | Levine | B25J 9/161 |

OTHER PUBLICATIONS

Kanehiro et al., "Virtual Humanoid Robot Platfrom to Develop Controllers of Real Humanoid Robots without Porting", IEEE, p. 1093-1099, 2001.

Hou et al., "Teleoperation Characteristics and Human Response Factor in Relation of a Robotic Welding System", IEEE, p. 1195-1202, 1999.

Kalra et al., "Real-Time Animation of Realistic Virtual Humans", IEEE, p. 42-56, 1998.

U.S. Appl. No. 10/735,294, filed Dec. 12, 2003 entitled "Virtual Encounters.".

U.S. Appl. No. 10/734,617, filed Dec. 12, 2003 entitled "Virtual Encounters", now U.S. Pat. No. 8,600,550.

U.S. Appl. No. 10/734,616, filed Dec. 12, 2003 entitled "Virtual Encounters.".

U.S. Appl. No. 10/735,595, filed Dec. 12, 2003 entitled Virtual Encounters:, now U.S. Pat. No. 9,948,885.

U.S. Appl. No. 10/734,618, filed Dec. 12, 2003 entitled "Virtual Encounters", now U.S. Pat. No. 9,841,809.

U.S. Appl. No. 15/496,213, filed Apr. 25, 2017, entitled "Multi-User and Multi-Surrogate Virtual Encounters.".

* cited by examiner

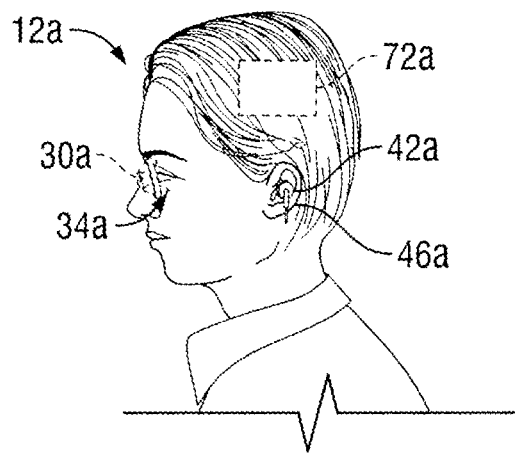
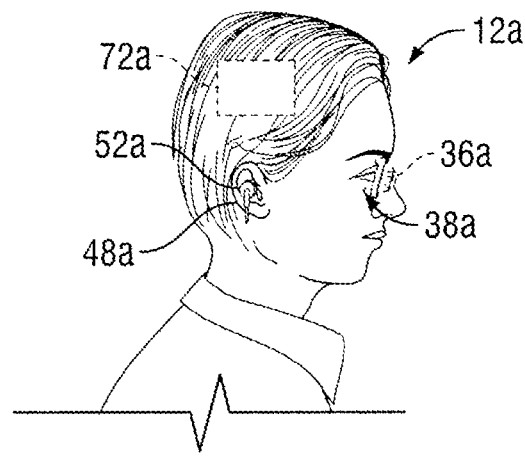
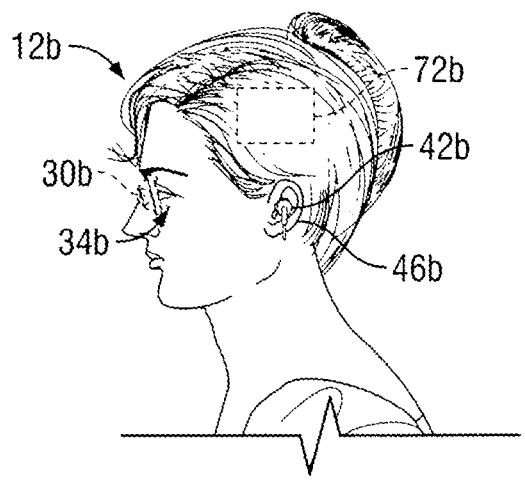
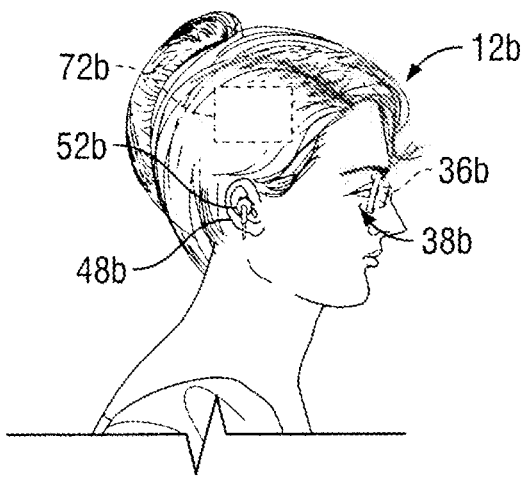
FIG. 2A  FIG. 2B

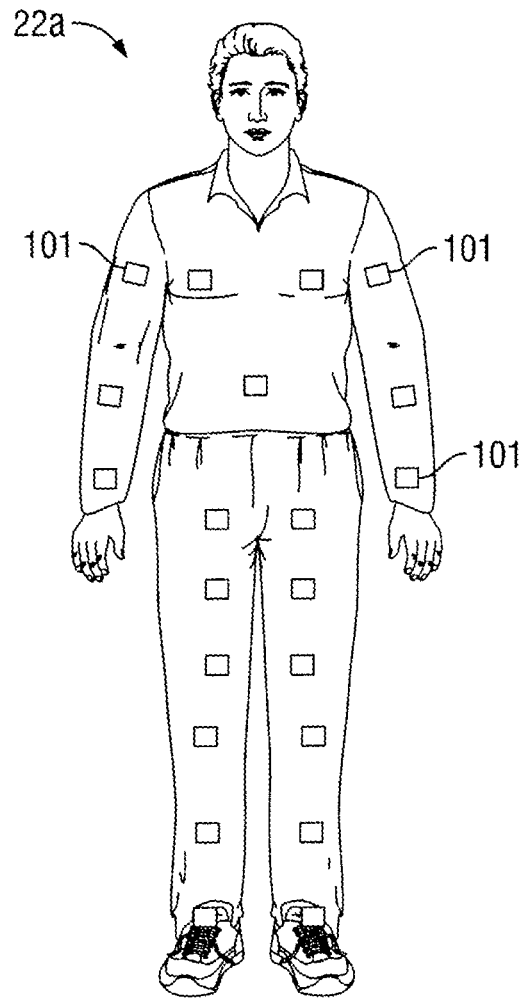
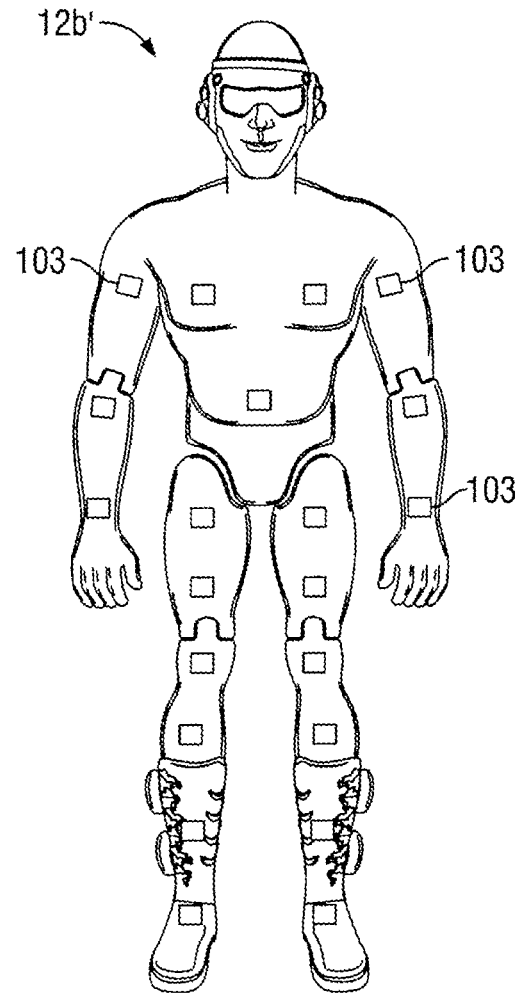
FIG. 7A
FIG. 7B

VIRTUAL ENCOUNTERS

TECHNICAL FIELD

This disclosure relates to virtual reality devices, and in particular, using these devices for communication and contact.

BACKGROUND

Two people can be separated by thousands of miles or across a town. With the development of the telephone, two people can hear each other's voice, and, to each of them, the experience is as if the other person was right next to them. Other developments have increased the perception of physical closeness. For example, teleconferencing and Internet cameras allow two people to see each other as well as hear each other over long distances.

SUMMARY

In one aspect, the invention is a virtual encounter system that includes a mannequin coupled to a camera for receiving a video image. The camera sends the video image to a communications network. The virtual encounter system also includes a processor for overlaying a virtual environment over one or more portions of the video image to form a virtual scene and a set of goggles to render the virtual scene.

In another aspect, the invention is a method of having a virtual encounter. The method includes receiving a video image at a camera coupled to a mannequin. The camera sends the video image to a communications network. The method also includes overlaying a virtual environment over one or more portions of the video image to form a virtual scene and rendering the virtual scene using a set of goggles.

One or more of the aspects above have one or more of the following advantages. The virtual encounter system adds a higher level of perception that two people are in the same place. Aspects of the system allow two people to touch and to feel each other as well as manipulate objects in each other's environment. Thus, a business person can shake a client's hand from across an ocean. Parents on business trips can read to their children at home and put them to bed. People using the system while in two different locations can interact with each other in a virtual environment of their own selection, e.g., a beach or a mountaintop. People can change their physical appearance in the virtual environment so that they seem taller or thinner to the other person or become any entity of their own choosing.

DESCRIPTION OF THE DRAWINGS

FIG. 2A is a view of a left side of a head of a mannequin.
FIG. 2B is a view of a right side of the head of the mannequin.
FIG. 7A is a view of a user with motion sensors.
FIG. 7B is a view of a robot with motion actuators.

DESCRIPTION

Figure 1:
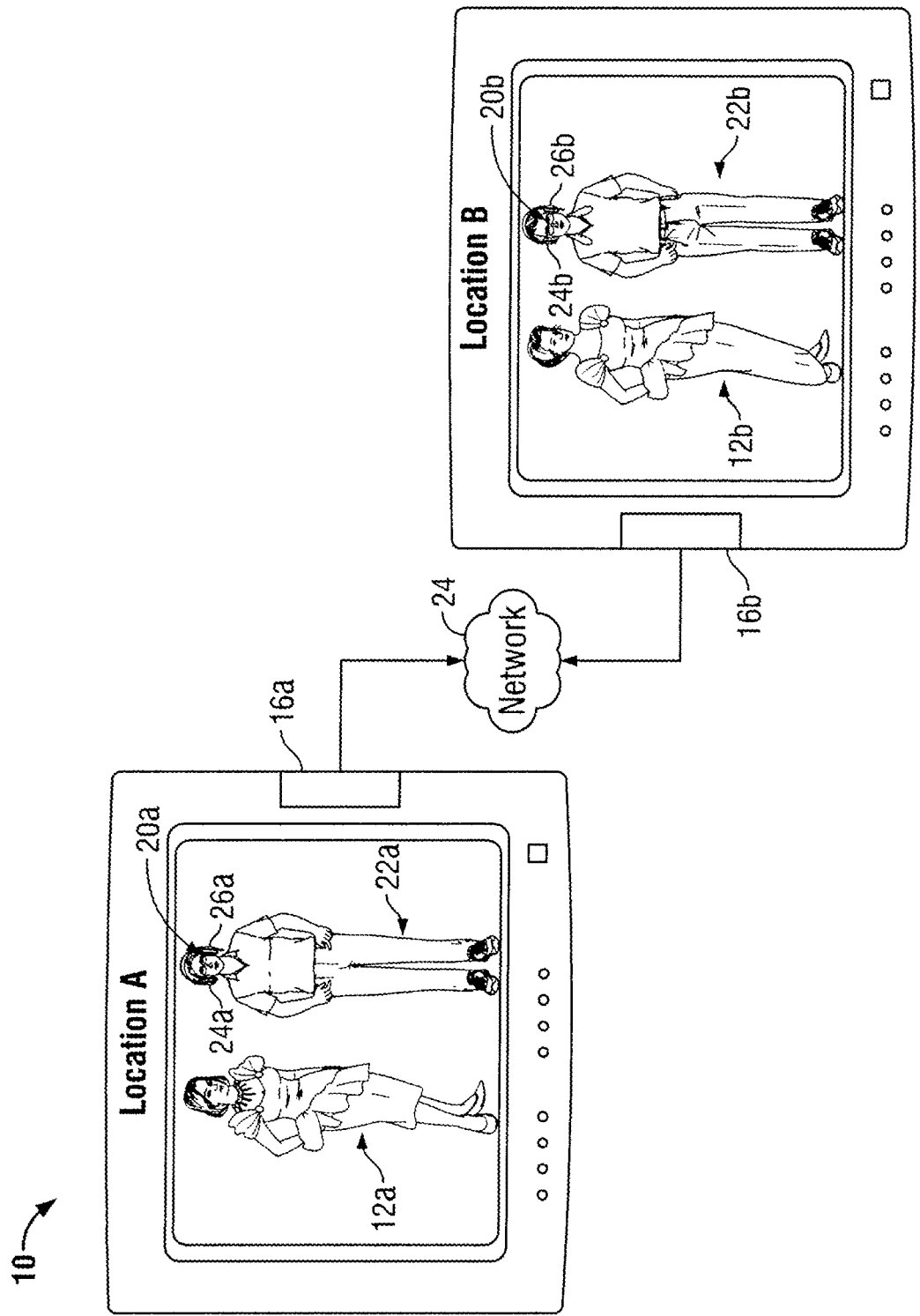
FIG. 1 is a view of a virtual encounter system.

Referring to FIG. 1, a virtual encounter system 10 includes in a first location A, a mannequin 12a, a communication gateway 16a, a set of goggles 20a worn by a user 22a, and two wireless earphones (earphone 24a and earphone 26a) also worn by user 22a. System 10 can further include in a location B, a mannequin 12b, a communication gateway 16b, a set of goggles 20b worn by a user 22b, and two wireless earphones (earphone 24b and earphone 26b) also worn by user 22b. Gateway 16a and gateway 16b are connected by a network (e.g., the Internet).

As will be explained below, when user 22a interacts with mannequin 12a in location A by seeing and hearing the mannequin, user 22a perceives seeing user 22b and hearing user 22b in location B. Likewise, user 22b listens and sees mannequin 12b but perceives listening and seeing user 22a in location A. Details of the gateways 16a and 16b are discussed below. Suffice it to say that the gateways 16a and 16b execute processes to process and transport raw data produced for instance when users 22a and 22b interact with respective mannequins 12a and 12b.

Referring to FIGS. 2A and 2B, each mannequin 12a-12b includes a camera (e.g., camera 30a and camera 30b) positioned in a left eye socket (e.g., left eye socket 34a and left eye socket 34b), and a camera (e.g., camera 36a and camera 36b) positioned in a right eye socket (e.g., right eye socket 38a and right eye socket 38b).

Each mannequin 12a-12b also includes a microphone (e.g., microphone 42a and microphone 42b) positioned within a left ear (e.g., left ear 46a and left ear 46b), and a microphone (e.g., microphone 48a and microphone 48b) positioned within a right ear (e.g., right ear 52a and right ear 52b).

Each mannequin 12a-12b further includes a transmitter (e.g., transmitter 72a and transmitter 72b) containing a battery (not shown). Transmitters 72a-72b send the audio and video signals from the cameras and the microphones to communication gateway 16a-16b.

Figure 3:
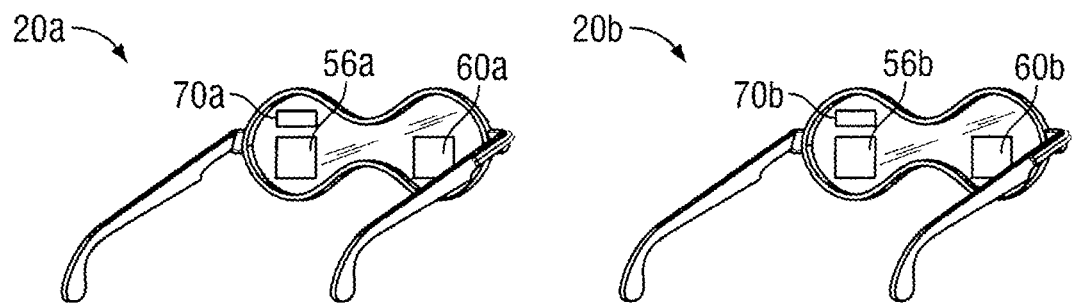
FIG. 3 is a view of a set of virtual glasses.

Referring to FIG. 3, each set of goggles 20a and 20b includes one left display (left display 56a and left display 56b) and one right display (right display 60a and right display 60b). Each set of goggles 20a and 20b includes a receiver (e.g., receiver 70a and receiver 70b) containing a battery source (not shown). Receivers 70a-70b receive the audio and video signals transmitted from processors 16a-16b.

Figure 4:
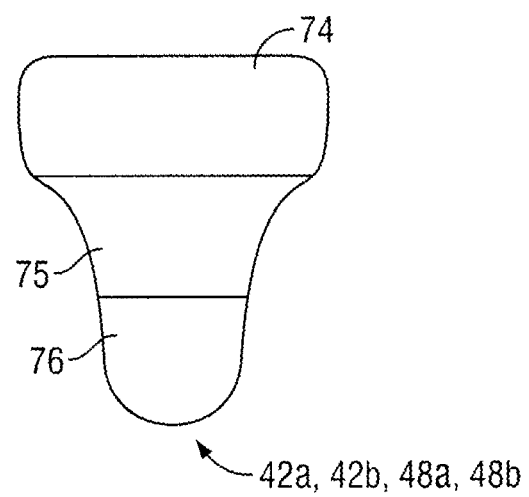
FIG. 4 is a view of a wireless earphone.

Referring to FIG. 4, each earphone 24a, 24b, 26a and 26b includes a receiver 74 for receiving audio signals from a corresponding microphone 42a, 42b, 48a and 48b an amplifier 75 for amplifying the audio signal and a transducer 76 for broadcasting audio signals.

Figure 5:
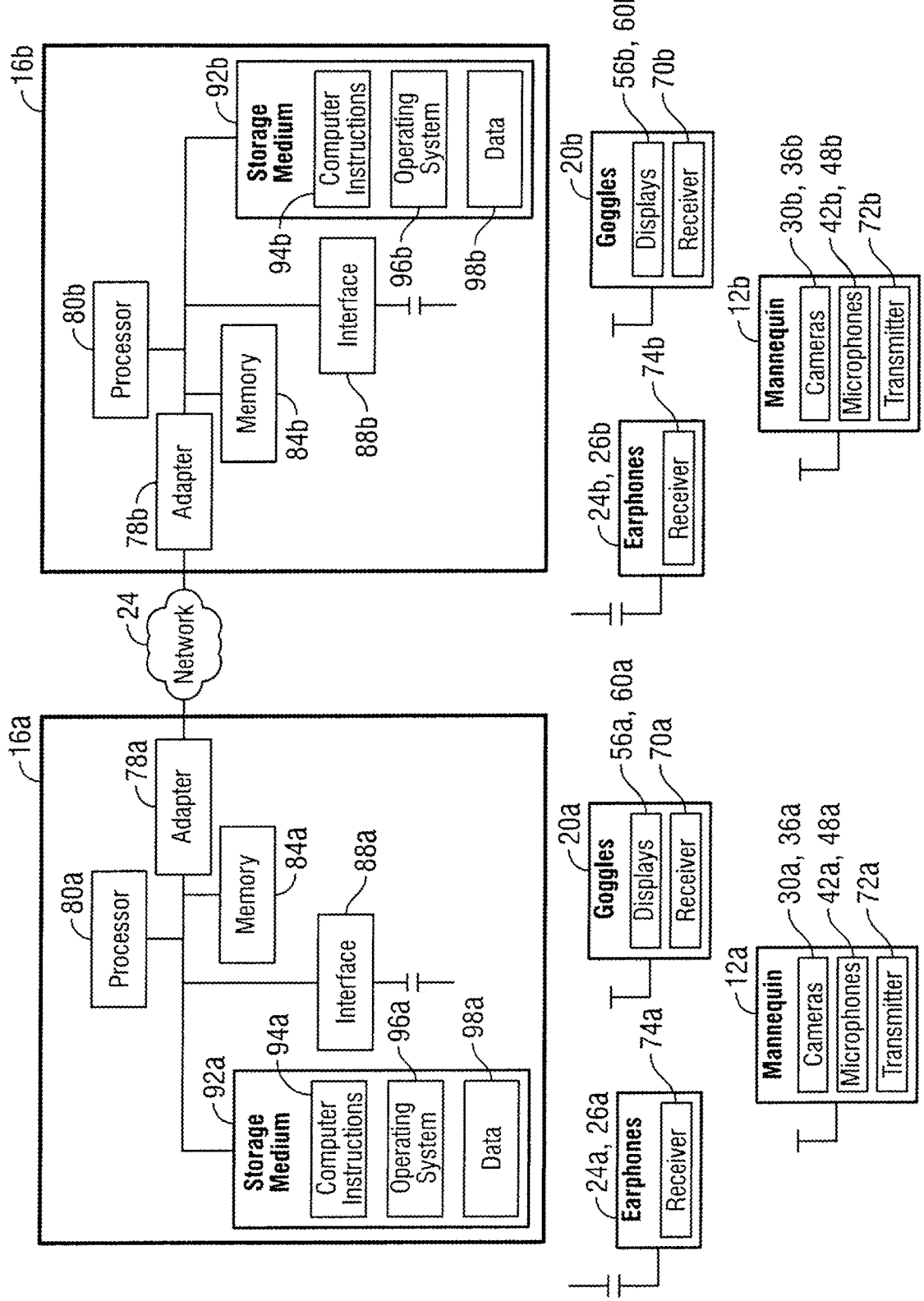
FIG. 5 is a functional diagram of the virtual encounter system.

Referring to FIG. 5, each communication gateway 16a-16b includes an adapter 78a-78b, a processor 80a-80b, memory 84a-84b, an interface 88a-88b and a storage medium 92a-92b (e.g., a hard disk). Each adapter 78a-78b establishes a bi-directional signal connection with network 24.

Each interface 88a-88b receives, via transmitter 72a-78b in mannequin 12a-12b, video signals from cameras 30a-30b, 36a-36b and audio signals from microphones 42a-42b, 48a-48b. Each interface 88a-88b sends video signals to displays 56a, 56b in goggles 20a-20b via receiver 70a-70b. Each interface 88a sends audio signals to earphones 24a-24b, 26a-26b in goggles 20a-20b via receiver 74a-74b.

Each storage medium 92a-92b stores an operating system 96a-96b, data 98a-98b for establishing communications links with other communication gateways, and computer instructions 94a-94b which are executed by processor 80a-80b in respective memories 84a-84b to coordinate, send and receive audio, visual and other sensory signals to and from network 24.

Signals within system 10 are sent using a standard streaming connection using time-stamped packets or a stream of bits over a continuous connection. Other examples, include using a direct connection such as an integrated services digital network (ISDN).

Figure 6:
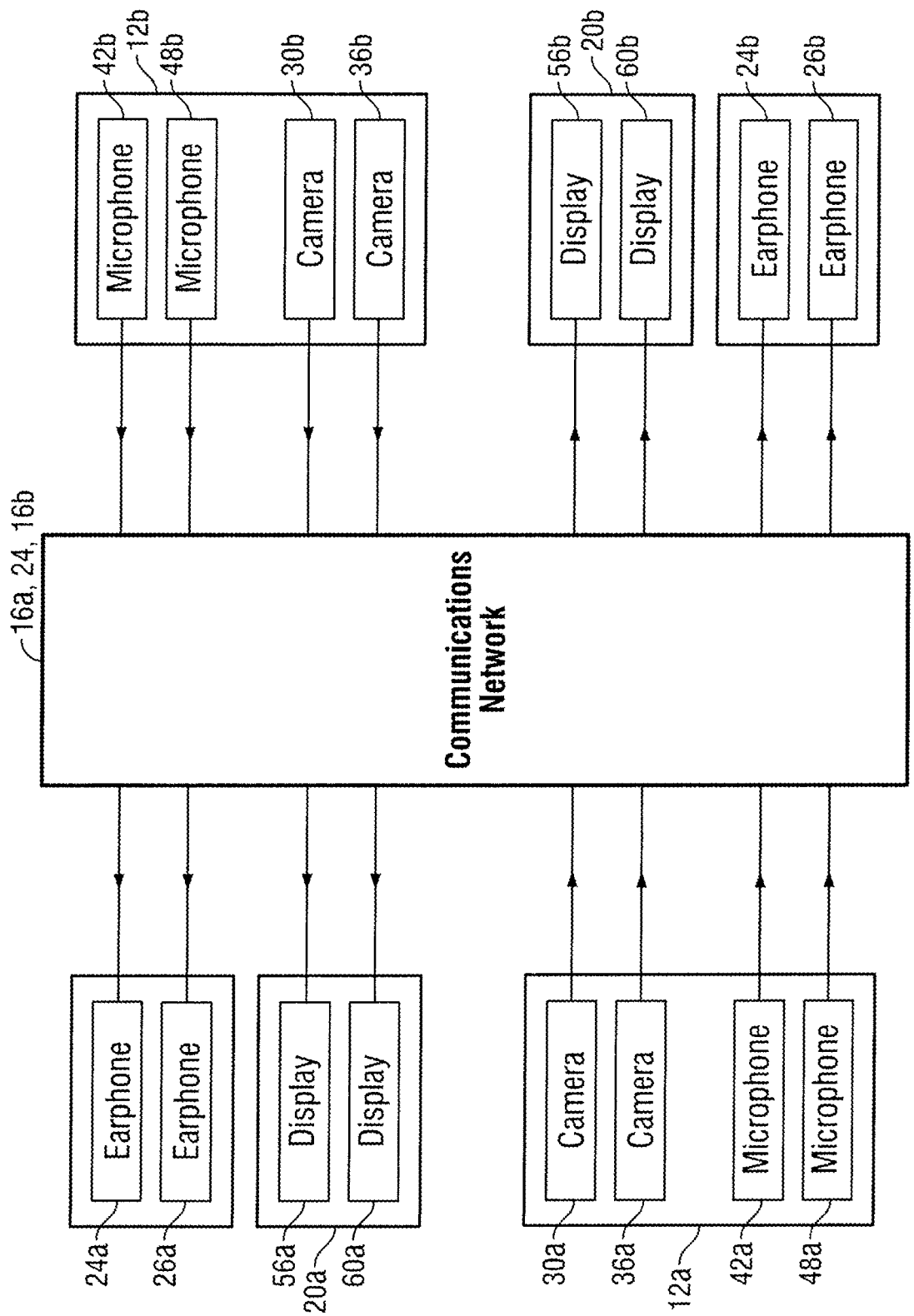
FIG. 6 is a signal flow diagram of the virtual encounter system.

Referring to FIG. 6, in operation, camera 30b and camera 36b record video images from Location B. The video images are transmitted wirelessly to communication gateway 16b as video signals. Communication gateway 16b sends the video signals through network 28 to communication gateway 16a. Communication gateway 16b transmits the video signals wirelessly to set of goggles 20a. The video images recorded by camera 30b are rendered on to display 56a, and the video images recorded on camera 36b are rendered on to display 60a.

Likewise, communication gateway 16a and communication gateway 16b work in the opposite direction through network 24, so that the video images, from location A, recorded by camera 30a are rendered on to display 56b. The video images, recorded by camera 36a are rendered on display 60b.

The sounds received by microphone 42a in location A, are transmitted to earphone 24b and sounds received in location A by microphone 52a are transmitted to earphone 26b. The sounds received by microphone 42b in location B, are transmitted to earphone 24a and sounds received in location B by microphone 52b are transmitted to earphone 26a.

Using system 10, two people can have a conversation where each of the persons perceives that the other is in the same location as them.

Referring to FIGS. 7A and 7B, the user 22a is shown wearing motion sensors 101, over portions of their bodies, and in particular over those portions of the body that exhibit movement. In addition, the mannequins are replaced by robots. For example, a robot 12b' includes a series of motion actuators 103. Each motion actuator 103 placement corresponds to a motion sensor 101 on the user 22a so that each motion sensor activates a motion actuator in the robot that makes the corresponding movement.

For example, when the user 22a moves their right hand, a sensor in the right hand sends a signal through the network to a motion actuator on the robot 12b'. The robot 12b' in turn moves its right hand.

In another example, a user 22a can walk towards a robot 12a' in location A. All the sensors on the user 22a send a corresponding signal to the actuators on the robot 12b' in location B. The robot 12b' in location B performs the same walking movement. The user 22b in location B is not looking in location B but rather through the eyes of the robot 12a' in location A so that user 22b does see the user 22a in location A walking towards them, but not because the robot 12b' in location B is walking. However, the fact that the robot 12b' in location B is walking enables two things to happen. First, since the user 22a in location A is seeing through the eyes of the robot 12b' in location B and since the robot 12b' in location B is walking enables the user 22a in location A to see what he would see if he were indeed walking in location B. Second, it enables the robot 12b' in location B to meet up with the user 22b in location B.

Figure 8A:
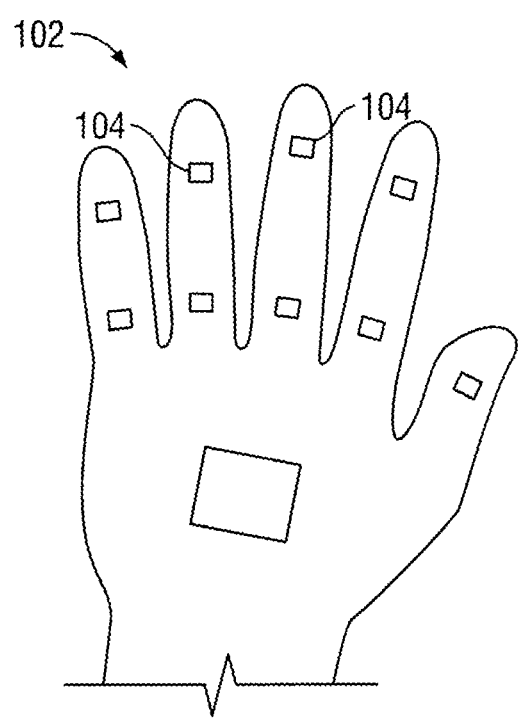
FIG. 8A is a view of a left hand of the robot.
Figure 8B:
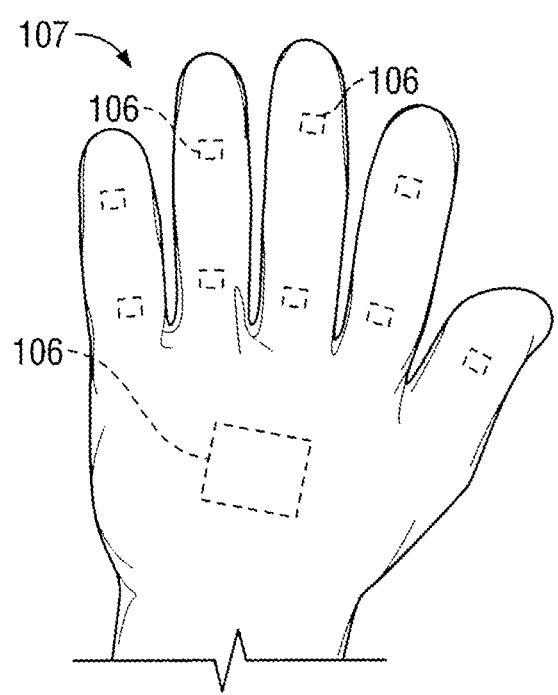
FIG. 8B is a view a left glove worn by the user.

Referring to FIGS. 8A and 8B, in still other embodiments, tactile sensors 104 are placed on the exterior of a robot hand 102 located in Location A. Corresponding tactile actuators 106 are sewn into an interior of a glove 107 worn by a user in location B. Using system 10, a user in location B can feel objects in Location A. For example, a user can see a vase within a room, walk over to the vase, and pick-up the vase. The tactile sensors-actuators are sensitive enough so that the user can feel the texture of the vase.

Figure 9A:
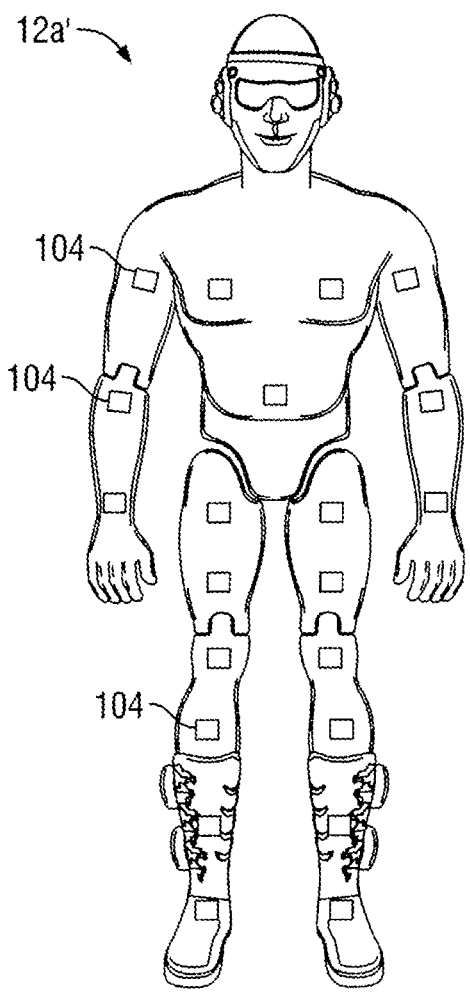
FIG. 9A is a view of a robot with tactile actuators.
Figure 9B:
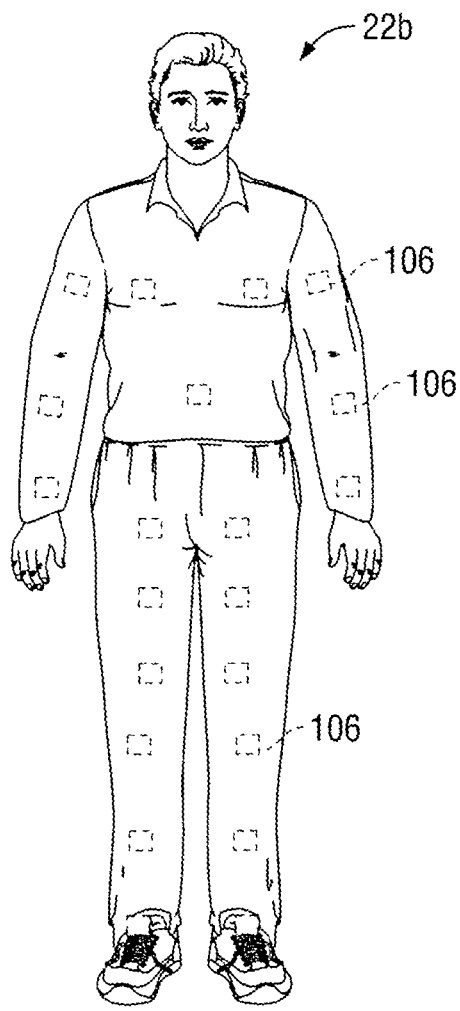
FIG. 9B is a view of the user with tactile sensors.

Referring to FIGS. 9A and 9B, in other embodiments, sensors are placed over various parts of a robot. Corresponding actuators can be sewn in the interior of a body suit that is worn by a user. The sensors and their corresponding actuators are calibrated so that more sensitive regions of a human are calibrated with a higher degree of sensitivity.

Figure 10A:
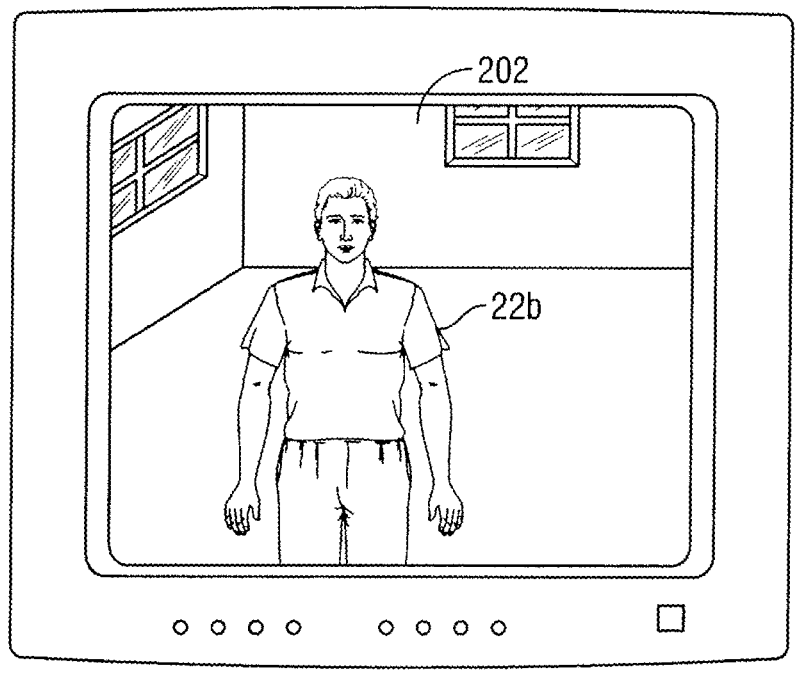
FIG. 10A is a view of a scene with the user in a room.
Figure 10B:
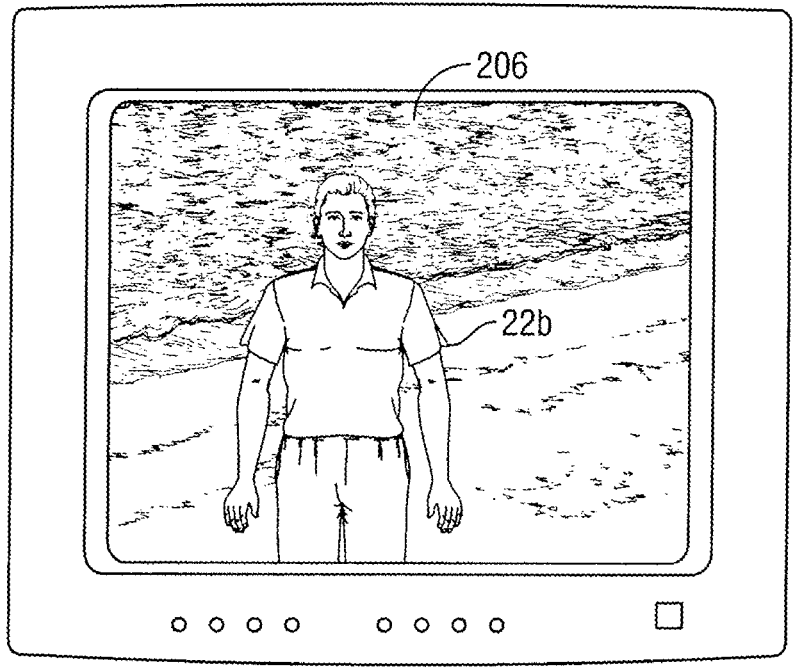
FIG. 10B is a view of the scene with the user on a beach.

Referring to FIGS. 10A and 10B in other embodiments, user 22a can receive an image of a user 22b but the actual background behind user 22b is altered. For example, user 22b is in a room 202 but user 22a perceives user 22b on a beach 206 or on a mountaintop (not shown). Using conventional video image editing techniques, the communication gateway 16a processes the signals received from Location B and removes or blanks-out the video image except for the portion that has the user 22b. For the blanked out areas on the image, the communication gateway 16a overlays a replacement background, e.g., virtual environment to have the user 22b appear to user 22a in a different environment. Generally, the system can be configured so that either user 22a or user 22b can control how the user 22b is perceived by the user 22a. Communication gateway 16a using conventional techniques can supplement the audio signals received with stored virtual sounds. For example, waves are added to a beach scene, or eagles screaming are added to a mountaintop scene.

In addition, gateway 16a can also supplement tactile sensations with stored virtual tactile sensations. For example, a user can feel the sand on her feet in the beach scene or a cold breeze on her cheeks in a mountain top scene.

In this embodiment, each storage medium 92a-92b stores data 98a-98b for generating a virtual environment including virtual visual images, virtual audio signals, and virtual tactile signals. Computer instructions 94a-94b, which are executed by processor 80a-80b out of memory 84a-84b, combine the visual, audio, and tactile signals received with the stored virtual visual, virtual audio and virtual tactile signals in data 98a-98b.

Figure 11A:
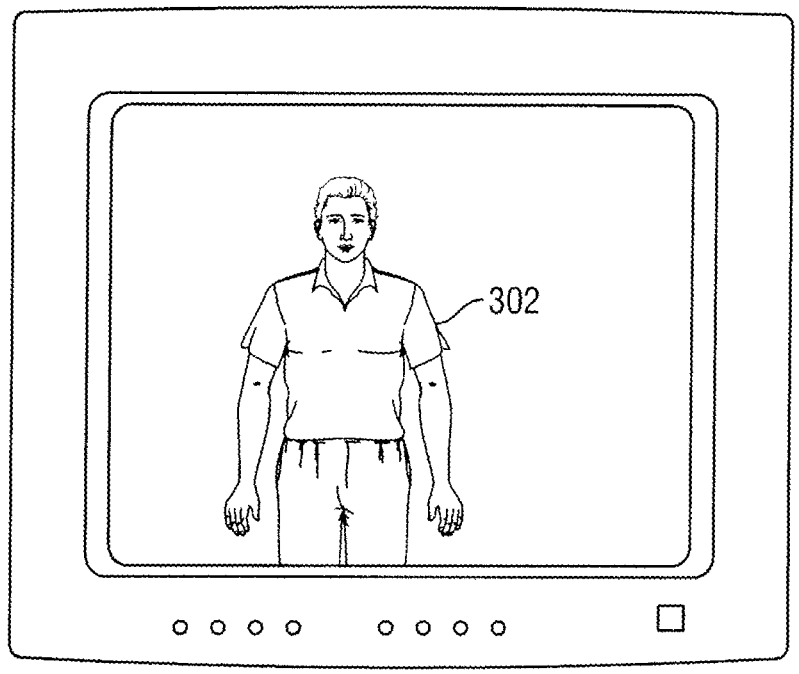
FIG. 11A is a view of an image of the user.
Figure 11B:
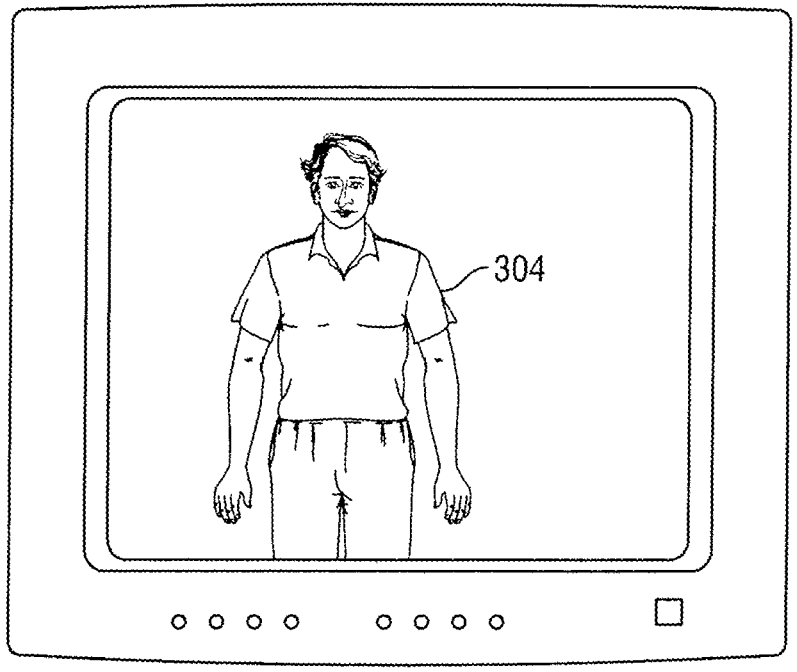
FIG. 11B is a view of a morphed image of the user.

Referring to FIGS. 11A and 11B, in other embodiments, a user 22a can receive a morphed image 304 of user 22b. For example, an image 302 of user 22b is transmitted through network 24 to communications gateway 16a. User 22b has brown hair, brown eyes and a large nose. Communications gateway 16a again using conventional imaging morphing techniques alters the image of user 22b so that user 22b has blond hair, blue eyes and a small nose and sends that image to goggles 20a to be rendered.

Communication gateway 16a also changes the sound user 22b makes as perceived by user 22a. For example, user 22b has a high-pitched squeaky voice. Communication gateway 22b using conventional techniques can alter the audio signal representing the voice of user 22b to be a low deep voice.

In addition, communication gateway 16a can alter the tactile sensation. For example, user 22b has cold, dry and scaling skin. Communications gateway 16a can alter the perception of user 22*a* by sending tactile signals that make the skin of user 22*b* seem smooth and soft.

In this embodiment, each storage medium 92*a*-92*b* stores data 98*a*-98*b* for generating a morph personality. Computer instructions 94*a*-94*b*, which are executed by processor 80*a*-80*b* out of memory 84*a*-84*b*, combine the visual, audio, and tactile signals received with the stored virtual visual, virtual audio and virtual tactile signals of a personality in data 98*a*-98*b*.

Thus using system 10 anyone can assume any other identity if it is stored in data 98*a*-98*b*.

In other embodiments, earphones are connected to the goggles. The goggles and the earphones are hooked by a cable to a port (not shown) on the communication gateway.

Other embodiments not described herein are also within the scope of the following claims.

What is claimed is:

1. A system comprises:
   a set of motion sensors at a first physical location, configured to be carried on a user and to send a set of motion signals corresponding to movements of the user;
   a set of goggles at the first physical location, configured to be carried on a user, the goggles including a display to render first video signals;
   a first gateway configured to:
      receive the set of motion signals and send the received motion signals over a network to a second gateway;
      receive a first set of video signals from the second gateway;
      morph the first set of video signals to provide the first video signals to the set of goggles, with the first set of video signals that are morphed by the first gateway are the first set of video signals that are received from a camera on a second robot at the second physical location;
      receive a second, different set of motion signals from the second gateway;
   a robot at the first physical location, the robot comprising:
      a set of motion actuators controlled by the second, different set of motion signals from the first gateway to induce movement of the robot; and
      at least one camera supported on the robot, the at least one camera producing a second different set of video signals to send to the first gateway for transport over the network to the second gateway at a second physical location.

2. The system of claim 1 wherein the first gateway configured to morph the first set of video signals is further configured to:
   apply image morphing to the set of video signals.

3. The system of claim 1, further comprising:
   a set of tactile sensors at the first physical location, configured to be carried on the user and to send a set of tactile signals;
   a transducer at the first physical location to render first audio signals, wherein the first gateway further configured to receive a first set of audio signals from the second gateway.

4. The system of claim 1 wherein the first gateway is further configured to:
   retrieve a virtual environment from a storage medium, the virtual environment including virtual visual images, virtual audio signals, and virtual tactile signals; and
   the first gateway is further configured to execute computer instructions to:
      combine the first set of video signal, the first set of audio signals and the set of tactile signals received by the first gateway with retrieved the virtual video, virtual audio and virtual tactile signals to overlay the retrieved virtual environment over one or more portions of the video image to form a virtual scene that is rendered by the set of goggles.

5. The system of claim 1 wherein the robot is a first robot, system further comprising:
   a second robot in a second, different physical location, the second robot having at least one camera for producing the first set of video signals;
   a second set of goggles at the second, different physical location to receive from the second gateway, the second, different set of video signals produced by the camera on the first robot; and
   the second gateway, with the second gateway further configured to:
      receive the first set of video signals; and
      send the first set of video signals to the first gateway.

6. The system of claim 5 wherein the first and the second robots are humanoid robots having life-like features, with each of the first and second humanoid robots comprising:
   a body having a head portion with at least one eye socket, with the at least one camera in the at least one eye socket.

7. The system of claim 5 wherein the second gateway that receives the video signals from the at least one camera on the second robot is further configured to
   apply image morphing to the first set of video signals to alter an image of a user.

8. The system of claim 5 wherein the second gateway that receives the video signals from the at least one camera on the second robot is further configured to
   apply image morphing to the first set of video signals to alter an image of a user.

9. The system of claim 5 wherein the first and the second robots each includes actuators corresponding to the motion sensors, the actuators causing corresponding robots to move according to movements of a user, as detected by the set of motion sensors in each corresponding location relative to a reference.

10. The system of claim 5 wherein each of the first gateway and the second gateway, further comprises:
    an interface coupled to the communications network, the interface having one or more channels to:
    receive audio signals from a corresponding one of microphones coupled to the first and second robots;
    receive video signals from a corresponding one of first and second cameras coupled to the first and second robots;
    send video signals to a corresponding one of the first and second sets of goggles; and
    send audio signals to a corresponding one of the first and second transducers.

11. The system of claim 5 wherein each of the first and the second set of goggles, comprises a receiver to receive the video signals and a transmitter to wirelessly send the audio signals, motion signals and the video signals to the communications network.

12. A method of conducting a virtual encounter between a pair of users comprises:
    sending a set of motion signals from a set of motion sensors positioned on a user at a first physical location, the set of motion signals corresponding to movements of the user;
    receiving a first set of video signals;

morphing the first set of video signals to provide first video signals, with the first set of video signals that are morphed being the first set of video signals that are received from a camera on a second robot at the second, different physical location; and rendering the first video signals in a display in a first set of goggles to render a morphed image including a morphed image of a second user at a second physical location;

receiving a second, different set of motion signals;

applying the second, different set of motion signals to motion actuators on a robot at the first physical location to control movement of the robot by the second, different set of motion signals; and producing a second different set of video signals from at least one camera supported on the robot for transport over a network to a second different, physical location.

13. The method of claim 12 wherein morphing the first set of video signals comprises:

applying image morphing to the first set of video signals.

14. The method of claim 12 further comprising:

sending a set of tactile signals from a set of tactile sensors at the first physical location; and receiving a first set of audio signals;

rendering first audio signals by a transducer at the first physical location.

15. The method of claim 14 further comprising:

retrieving from a storage medium, a virtual environment that includes virtual visual images, virtual audio signals, and virtual tactile signals; and combining the first set of video signal, the first set of audio signals and the set of tactile signals received with the retrieved the virtual video, virtual audio and virtual tactile signals to overlay the retrieved virtual environment over one or more portions of the video image to form a virtual scene that is rendered by the set of goggles.

16. The method of claim 12 wherein the robot is a first robot, method further comprises:

producing the first set of video signals from a camera on a second robot in the second, different physical location;

receiving by a second set of goggles at the second, different physical location the second, different set of video signals produced by the camera on the first robot; and sending the first set of video signals to the first set of goggles at the first physical location.

17. The method of claim 16 wherein the first and the second robots are humanoid robots having life-like features, with each of the first and second humanoid robots comprising:

a body having a head portion with at least one eye socket, with the at least one camera in the at least one eye socket.

18. The method of claim 16 wherein first and second gateways receive and morph respectively the first set of video signals and the second set of video signals and the first and second gateways send respectively the first set of motion signals and the second set of motion signals.

19. The method of claim 16, further comprising:

retrieving from a storage medium, virtual tactile sensation data; and combining further includes:

combining the virtual tactile sensation data with the set of tactile signals received to form a virtual tactile sensation that are rendered on tactile actuators carried by the user.

20. The method of claim 18 wherein the first gateway in the first location and the second gateway in the second location and are connected via a communications network.

21. The method of claim 18 wherein each of the first and the second robots, comprise a transmitter and receiver.

* * * * *